(12) United States Patent
Abraham et al.

(10) Patent No.: US 8,982,812 B2
(45) Date of Patent: Mar. 17, 2015

(54) GROUP ID ALLOCATION FOR DIRECT LINK SERVICE (DLS)

(75) Inventors: Santosh Paul Abraham, San Diego, CA (US); Sameer Vermani, San Diego, CA (US); Simone Merlin, San Diego, CA (US); Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 13/348,353

(22) Filed: Jan. 11, 2012

(65) Prior Publication Data

US 2013/0010708 A1    Jan. 10, 2013

Related U.S. Application Data

(60) Provisional application No. 61/433,066, filed on Jan. 14, 2011.

(51) Int. Cl.
*H04W 4/00* (2009.01)
*H04W 4/08* (2009.01)
(Continued)

(52) U.S. Cl.
CPC .............. *H04W 72/046* (2013.01); *H04W 4/08* (2013.01); *H04W 72/042* (2013.01); *H04W 72/121* (2013.01); *H04W 84/18* (2013.01)
USPC ........................................................ 370/329

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

2005/0169220 A1*  8/2005  Sreemanthula et al. ...... 370/338
2005/0259627 A1*  11/2005  Song et al. .................... 370/342
(Continued)

FOREIGN PATENT DOCUMENTS

JP      2013511217 A    3/2013
WO    2010086715 A1    8/2010
WO    2011060267 A1    5/2011

OTHER PUBLICATIONS

Abichar, et al., "Group Based Medium Access for Next Generation Wireless LANs", Proceedings of the 2006 International Symposium on a World of Wireless, Mobile and Multimedia Networks, Dec. 31, 2006, XP040041212.
(Continued)

*Primary Examiner* — Ronald Abelson
(74) *Attorney, Agent, or Firm* — Dang M. Vo (57) ABSTRACT

Certain aspects of the present disclosure provide techniques and apparatus for managing group identifiers (IDs) in multiuser multiple-input multiple-output (MU-MIMO) schemes to ensure that the group ID maps to the same assigned spatial stream position for a particular station (STA), for either Direct Link Service (DLS) or downlink (DL) MU-MIMO transmissions. One example method generally includes transmitting, from a first apparatus to a second apparatus, a message requesting assignment of a group ID identifying a group of apparatuses for receiving MU transmissions; and receiving, from the second apparatus, an indication of the assigned group ID, such that spatial stream assignments for the group of apparatuses are the same between the first and second apparatuses, the spatial stream assignments corresponding to the assigned group ID.

43 Claims, 7 Drawing Sheets

(51) Int. Cl.
 *H04W 72/04* (2009.01)
 *H04W 72/12* (2009.01)
 *H04W 84/18* (2009.01)

(56) References Cited

U.S. PATENT DOCUMENTS

2009/0093232 A1 4/2009 Gupta et al.
2010/0046492 A1 2/2010 Abraham et al.
2010/0309834 A1 12/2010 Fischer et al.
2011/0002219 A1 1/2011 Kim et al.
2011/0096796 A1 4/2011 Zhang et al.
2011/0188598 A1* 8/2011 Lee et al. ............ 375/267
2011/0261742 A1 10/2011 Wentink

OTHER PUBLICATIONS

International Search Report and Written Opinion—PCT/US2012/021374—ISA/EPO—Apr. 2, 2012.
Stacey R., et al., "IEEE P802.11 Wireless LANs—Specification Framework for TGac," IEEE 802.11-09/0992r18, Sep. 2010, 44 Pages.

* cited by examiner

GROUP ID ALLOCATION FOR DIRECT LINK SERVICE (DLS)

CROSS-REFERENCE TO RELATED APPLICATIONS

This application claims benefit of U.S. Provisional Patent Application Ser. No. 61/433,066 entitled "GROUP ID ALLOCATION FOR DIRECT LINK SERVICE (DLS)," filed Jan. 14, 2011, which is herein incorporated by reference.

BACKGROUND

1. Field

Certain aspects of the present disclosure generally relate to wireless communications and, more particularly, to managing group identifiers (IDs) in multiuser multiple-input multiple-output (MU-MIMO) schemes to ensure that the group ID maps to the same assigned spatial stream position for a particular station (STA), for either Direct Link Service (DLS) or downlink (DL) MU-MIMO transmissions.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into a number ($N_S$) of independent channels, which are also referred to as spatial channels or spatial streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure generally apply to a wireless local area network (WLAN) where an access point (AP) has data to send to multiple stations (STAs) or where the WLAN includes a Direct Link Service (DLS) to allow the STAs to transfer data between the STAs without AP intervention. By using the Downlink Spatial Division Multiple Access (DL-SDMA) technique, for example, the AP or a DLS transmitter (DLS-TxSTA) may send data at the same time towards multiple STAs. Certain aspects of the present disclosure generally relate to managing group identifiers (IDs) in multiuser multiple-input multiple-output (MU-MIMO) schemes to ensure that the group ID maps to the same assigned spatial stream position for a particular STA. The MU-MIMO scheme may comprise, for example, the DLS or the downlink (DL) MU-MIMO protocol.

Certain aspects of the present disclosure provide a method for wireless communications. The method generally includes transmitting, from a first apparatus to a second apparatus, a message requesting assignment of a group identifier (ID) identifying a group of apparatuses for receiving multi-user (MU) transmissions; and receiving, from the second apparatus, an indication of the assigned group ID, such that spatial stream assignments for the group of apparatuses are the same between the first and second apparatuses, the spatial stream assignments corresponding to the assigned group ID.

Certain aspects of the present disclosure provide a first apparatus for wireless communications. The first apparatus generally includes a transmitter configured to transmit, to a second apparatus, a message requesting assignment of a group ID identifying a group of apparatuses for receiving MU transmissions; and a receiver configured to receive, from the second apparatus, an indication of the assigned group ID, such that spatial stream assignments for the group of apparatuses are the same between the first and second apparatuses, the spatial stream assignments corresponding to the assigned group ID.

Certain aspects of the present disclosure provide a first apparatus for wireless communications. The first apparatus generally includes means for transmitting, to a second apparatus, a message requesting assignment of a group ID identifying a group of apparatuses for receiving MU transmissions; and means for receiving, from the second apparatus, an indication of the assigned group ID, such that spatial stream assignments for the group of apparatuses are the same between the first and second apparatuses, the spatial stream assignments corresponding to the assigned group ID Certain aspects of the present disclosure provide a computer-program product for wireless communications. The computer-program product generally includes a computer-readable medium having instructions executable to transmit, from a first apparatus to a second apparatus, a message requesting assignment of a group ID identifying a group of apparatuses for receiving MU transmissions; and to receive, from the second apparatus, an indication of the assigned group ID, such that spatial stream assignments for the group of apparatuses are the same between the first and second apparatuses, the spatial stream assignments corresponding to the assigned group ID Certain aspects of the present disclosure provide a wireless node, such as a DLS transmitter. The wireless node generally includes at least one antenna; a transmitter configured to transmit, to an apparatus via the at least one antenna, a message requesting assignment of a group ID identifying a group of apparatuses for receiving MU transmissions; and a receiver configured to receive, from the apparatus, an indication of the assigned group ID, such that spatial stream assignments for the group of apparatuses are the same between the wireless node and the apparatus, the spatial stream assignments corresponding to the assigned group ID Certain aspects of the present disclosure provide a method for wireless communications. The method generally includes receiving, at a first apparatus from a second apparatus, a message requesting assignment of a group ID identifying a group of apparatuses for receiving MU transmissions; and transmitting, to the second apparatus, an indication of the assigned group ID, such that spatial stream assignments, corresponding to the assigned group ID, for the group of apparatuses are the same between the first and second apparatuses.

Certain aspects of the present disclosure provide a first apparatus for wireless communications. The first apparatus generally includes a receiver configured to receive, from a second apparatus, a message requesting assignment of a group ID identifying a group of apparatuses for receiving MU transmissions; and a transmitter configured to transmit, to the second apparatus, an indication of the assigned group ID, such that spatial stream assignments, corresponding to the assigned group ID, for the group of apparatuses are the same between the first and second apparatuses.

Certain aspects of the present disclosure provide a first apparatus for wireless communications. The first apparatus generally includes means for receiving, from a second apparatus, a message requesting assignment of a group ID identifying a group of apparatuses for receiving MU transmissions; and means for transmitting, to the second apparatus, an indication of the assigned group ID, such that spatial stream assignments, corresponding to the assigned group ID, for the group of apparatuses are the same between the first and second apparatuses.

Certain aspects of the present disclosure provide a computer-program product for wireless communications. The computer-program product generally includes a computer-readable medium having instructions executable to receive, at a first apparatus from a second apparatus, a message requesting assignment of a group ID identifying a group of apparatuses for receiving MU transmissions; and to transmit, to the second apparatus, an indication of the assigned group ID, such that spatial stream assignments, corresponding to the assigned group ID, for the group of apparatuses are the same between the first and second apparatuses.

Certain aspects of the present disclosure provide an access point. The access point generally includes at least one antenna; a receiver configured to receive, from an apparatus via the at least one antenna, a message requesting assignment of a group ID identifying a group of apparatuses for receiving MU transmissions; and a transmitter configured to transmit, to the apparatus, an indication of the assigned group ID, such that spatial stream assignments, corresponding to the assigned group ID, for the group of apparatuses are the same between the access point and the apparatus.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier amendments to the IEEE 802.11 standard.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
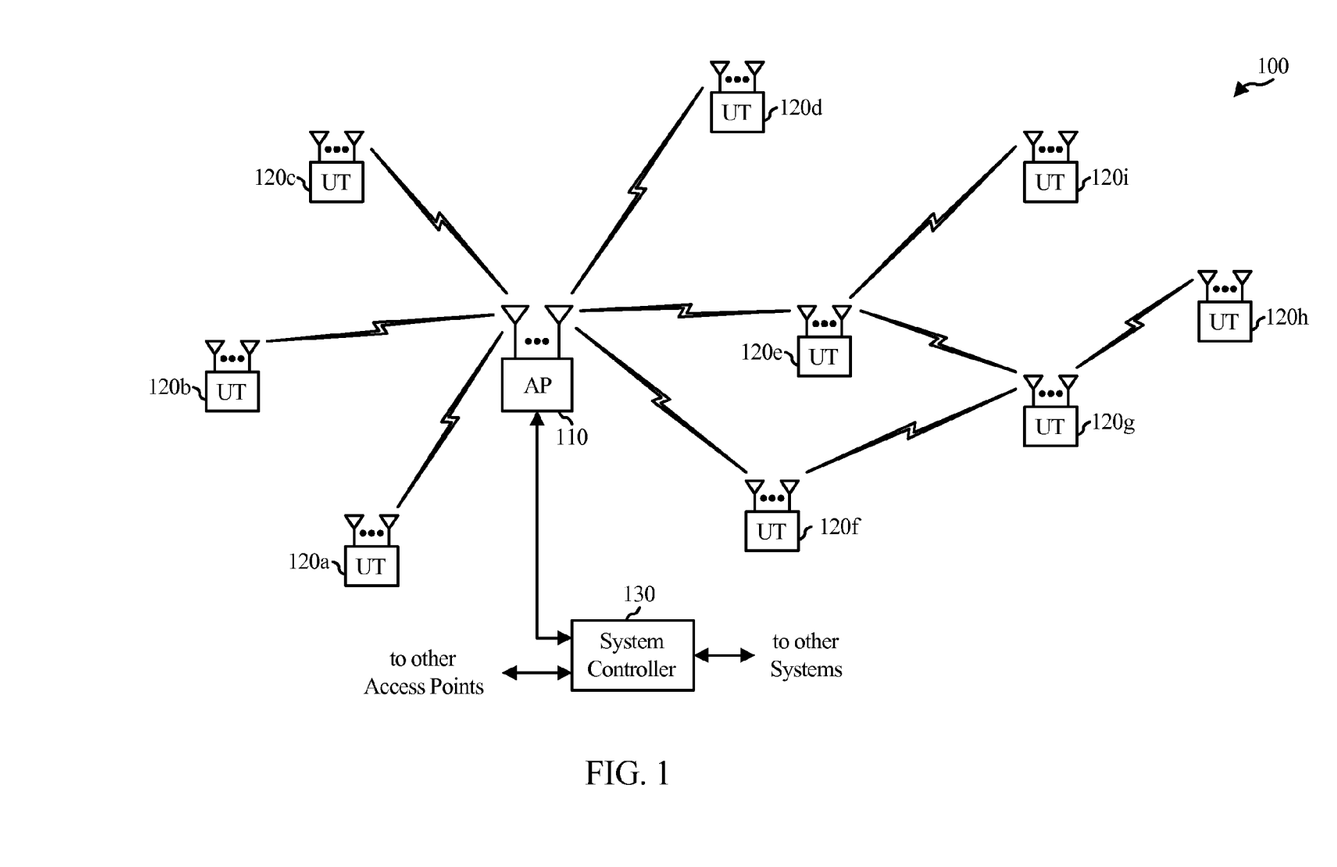
FIG. 1 illustrates a diagram of a wireless communications network in accordance with certain aspects of the present disclosure.

FIG. 1 illustrates a multiple-access multiple-input multiple-output (MIMO) system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
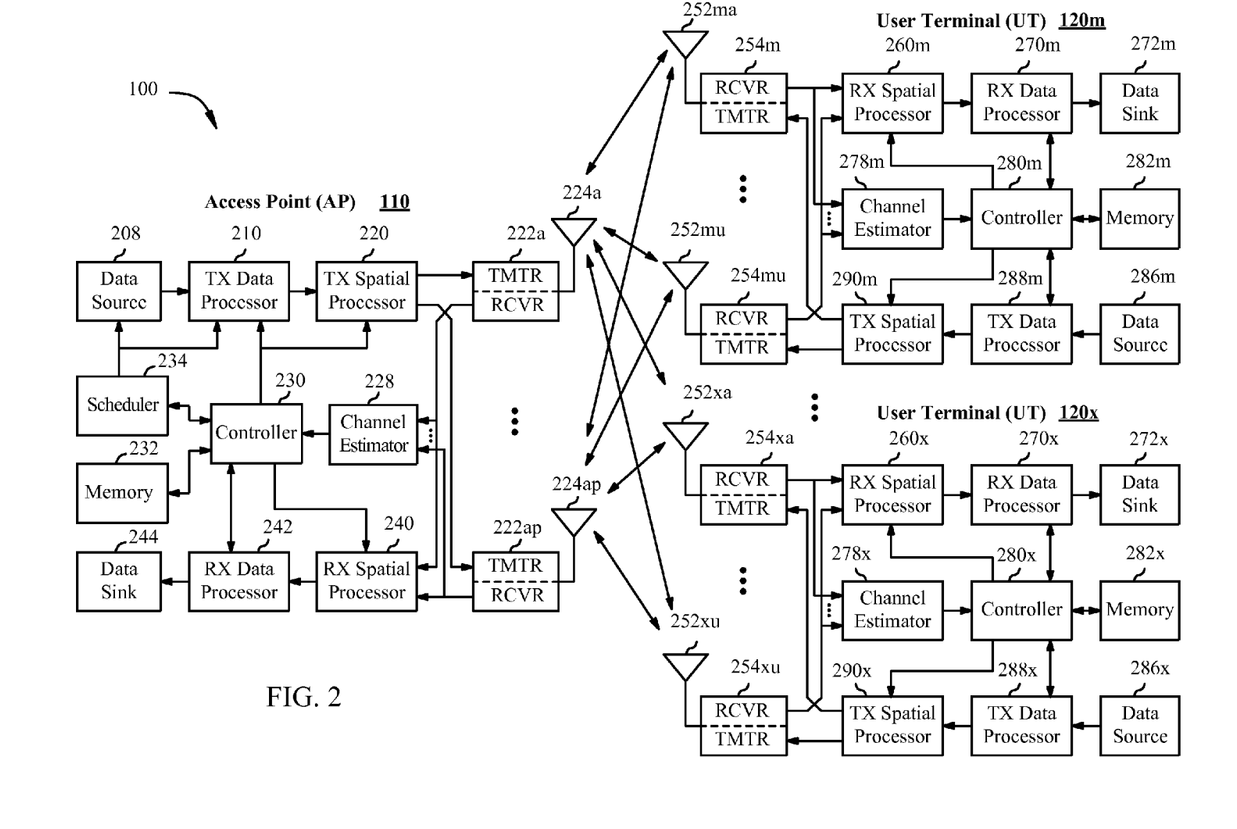
FIG. 2 illustrates a block diagram of an example access point (AP) and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as precoding or beamforming) on the $N_{dn}$ downlink data symbol streams and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves, and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
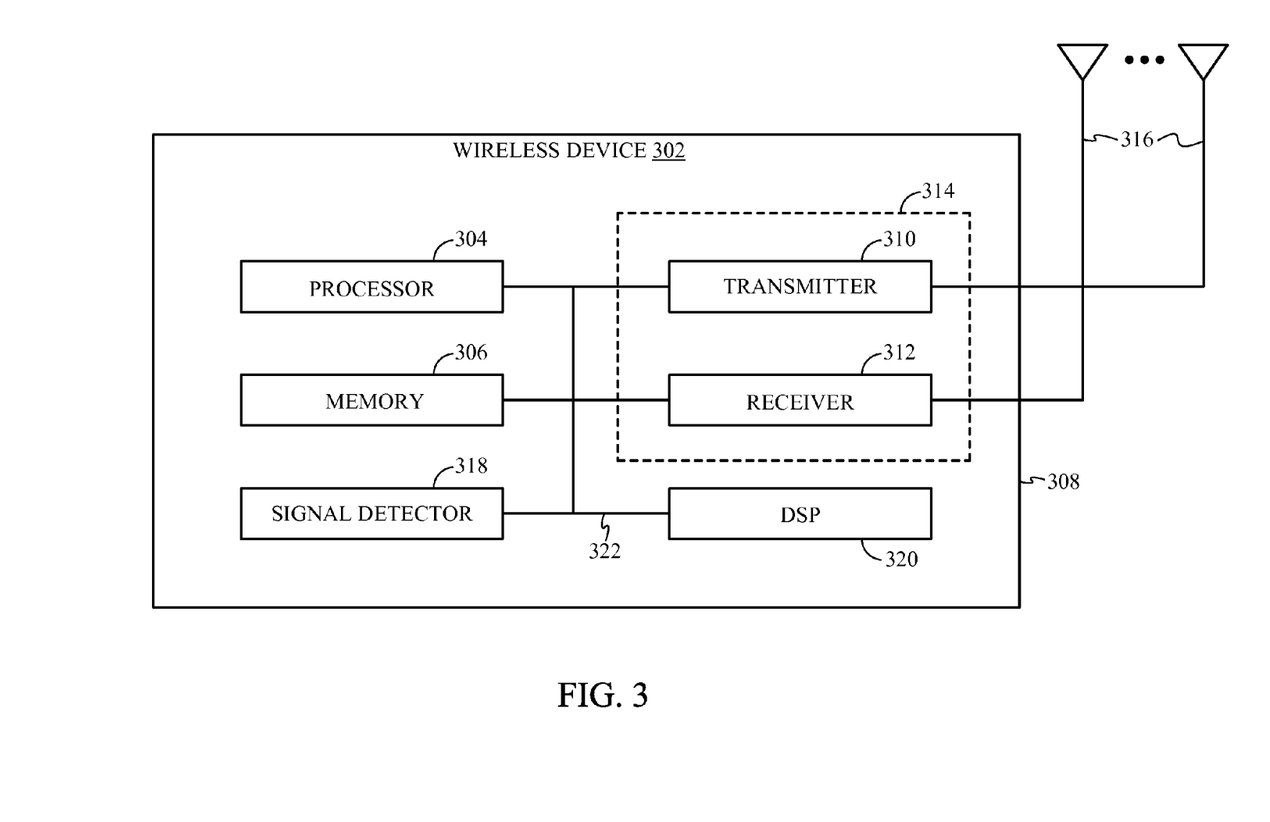
FIG. 3 illustrates a block diagram of an example wireless device in accordance with certain aspects of the present disclosure.

FIG. 3 illustrates various components that may be utilized in a wireless device 302 that may be employed within a wireless communication system, such as the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Preamble Structure with Group Definition

In next generation WLANs, such as the MIMO system 100 from FIG. 1, downlink (DL) multi-user (MU) MIMO transmission may represent a promising technique to increase overall network throughput. In most aspects of a DL MU-MIMO transmission, a non-beamformed portion of a preamble transmitted from an access point to a plurality of user stations (STAs) may carry a spatial stream allocation field indicating allocation of spatial streams to the STAs.

In order to parse this allocation information at a STA, each STA may be informed of its ordering or a STA number in a set of STAs from the plurality of STAs scheduled to receive the MU transmission. This may entail forming groups, wherein a group identifier (group ID) field in the preamble may convey, to the STAs, the set of STAs (and their order) being transmitted in a given MU transmission. With preamble bits adding to the transmission overhead, it may be desirable to expend as little bits on the group ID as possible, while not sacrificing on the flexibility with which STAs can be scheduled together in a MU-MIMO transmission at a given instant.

Figure 4:
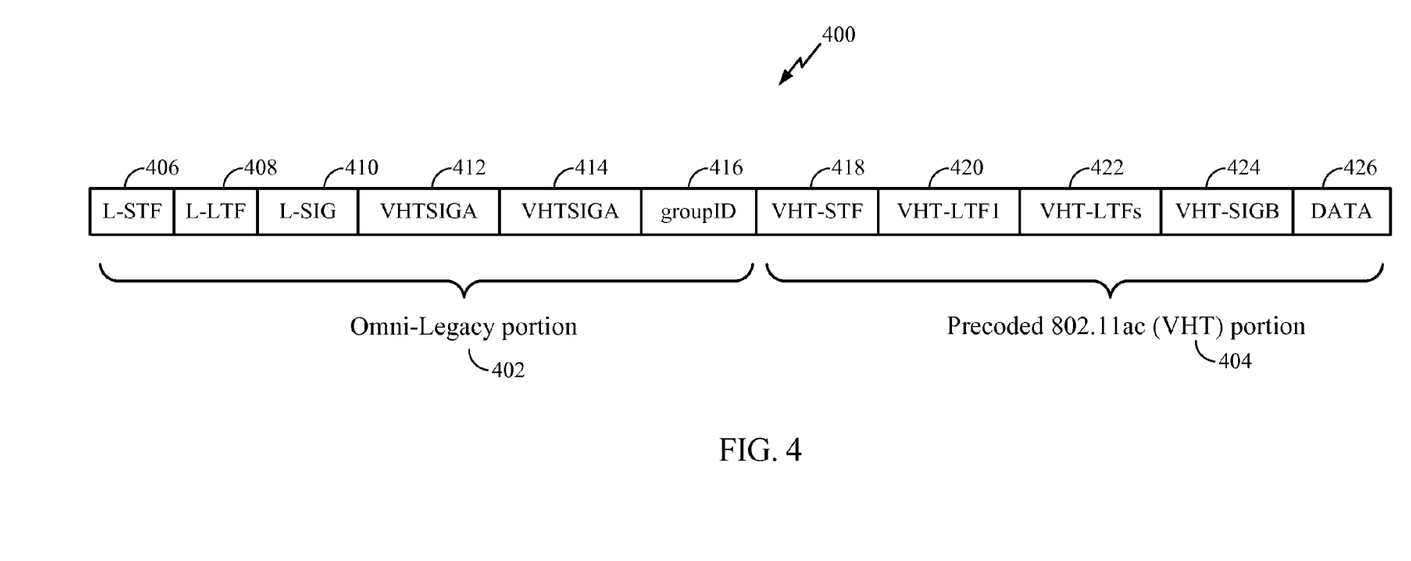
FIG. 4 illustrates an example structure of a preamble transmitted from an access point in accordance with certain aspects of the present disclosure.

FIG. 4 illustrates an example structure of a preamble 400 in accordance with certain aspects of the present disclosure. The preamble 400 may be transmitted, for example, from the access point (AP) 110 to the user terminals 120 in the wireless network illustrated in FIG. 1.

The preamble 400 may comprise an omni-legacy portion 402 (i.e., the non-beamformed portion) and a precoded 802.11ac VHT (Very High Throughput) portion 404. The legacy portion 402 may comprise: a Legacy Short Training Field (L-STF) 406, a Legacy Long Training Field 408, a Legacy Signal (L-SIG) field 410, and two OFDM symbols for VHT Signal A (VHT-SIG-A) fields 412, 414. The VHT-SIG-A fields 412, 414 may be transmitted omni-directionally and may indicate allocation of numbers of spatial streams to a combination (set) of STAs.

The precoded 802.11ac VHT portion 404 may comprise a Very High Throughput Short Training Field (VHT-STF) 418, a Very High Throughput Long Training Field 1 (VHT-LTF1) 420, Very High Throughput Long Training Fields (VHT-LTFs) 422, a Very High Throughput Signal B (VHT-SIG-B) field 424, and a data portion 426. The VHT-SIG-B field may comprise one OFDM symbol and may be transmitted precoded/beamformed.

Robust MU-MIMO reception may involve the AP transmitting all VHT-LTFs 422 to all supported STAs. The VHT-LTFs 422 may allow each STA to estimate a MIMO channel from all AP antennas to the STA's antennas. The STA may utilize the estimated channel to perform effective interference nulling from MU-MIMO streams corresponding to other STAs. To perform robust interference cancellation, each STA may be expected to know which spatial stream belongs to that STA, and which spatial streams belong to other users.

As aforementioned, a group ID field 416 may be included in the preamble 400 to convey to all supported STAs that a particular set of STAs will be receiving spatial streams of a MU-MIMO transmission. As a baseline, if groups are formed which may be mapped to unique sets of STAs, a very large number of group ID bits within the preamble 400 may be involved for complete scheduling flexibility.

Example Group ID Allocation for DLS

IEEE 802.11 ac is an amendment to the IEEE 802.11 standard that allows for higher throughput in 802.11 networks, which is realized through several measures such as parallel transmissions to multiple STAs at once, or by using a wider channel bandwidth such as 80 MHz or 160 MHz. IEEE 802.11ac is also referred to as Very High Throughput (VHT). As described above, groups may be formed in DL MU-MIMO transmission for WLANs for conveying the spatial stream positions to STAs.

Every VHT physical layer protocol data unit (PPDU) consists of a preamble 400 with a 6-bit group ID field 416 as described above. For a MU-MIMO transmission, a STA checks the group ID to determine the spatial stream index (i.e., the assigned spatial stream position) to obtain its own data. Group ID indices are managed by the AP. The AP uses group ID messaging to inform each STA of the spatial stream index corresponding to some or all of the possible $2^6$ group ID values.

In advanced VHT networks, MU-MIMO transmissions may occur between the STAs associated with an AP using mechanisms based on the Direct Link Service (DLS) protocol. However, for such STA-to-STA MU-MIMO transmission, a method for managing the Group IDs between the AP and the MU-MIMO-transmit-capable STAs is needed.

In order to correctly receive a DL MU-MIMO transmission, a receiver may typically be able to map the group ID to the exact spatial stream position. Note that the spatial stream position is typically utilized to correctly perform channel estimation.

In a network consisting of DLS and AP-to-STA MU-MIMO transmissions, it may be desirable to ensure that for a given group ID (say $I_n$), the DLS transmitter and the AP do not assign different spatial stream indices to a STA a for $I_n$. If this happens, the STA will likely not be able to decode the data sent with group ID $I_n$ from either the AP or the DLS. Group ID management may most likely ensure that a group ID—when used either in a DLS transmission or an AP-to-STA MU-MIMO transmission, for example—maps to the same spatial stream index at a destination STA. Accordingly, what is needed are techniques and apparatus for such group ID management.

Two methods of managing group IDs are described below: (1) a method where the AP assigns the group ID and the spatial stream index; and (2) a method where the AP partitions the group ID space.

AP Assigns Group ID and Spatial Stream Index

In this method, the DLS MU-MIMO sender (DLS-TxSTA) may request the AP to assign a group ID and spatial stream indices for a group of STAs. Then, the AP may assign a group ID and spatial stream indices for the group of STAs. The AP may assign the group ID in sequential order or randomly, for example, from the $2^6=64$ possible group IDs. The AP may assign the spatial stream indices in sequential order or randomly, for example, from a set of spatial stream indices (e.g., 4 spatial stream indices) that can correspond to a single group ID. The STAs may be informed of the new group ID assignment and the spatial stream index.

Two different methods may be used to inform the STAs. In the first method, the AP may send a group ID management message to each STA in the group (i.e., each STA other than the DLS-TxSTA) regarding the new group ID, which may include both the group ID and the spatial stream information. Once the AP has received an acknowledgement (ACK) from each STA for the group ID management message, the AP may send the DLS-TxSTA the assigned group ID and spatial stream index information. In the second method of informing the STAs, the AP may send the assigned group ID and spatial stream index information to the DLS-TxSTA. Then, the DLS-TxSTA may send the group ID management message to each of the STAs with its spatial stream assignment for the group ID.

For certain aspects, there may be an alternative AP operation according to the second method above. In this alternative second method, the AP may determine that a DLS-TxSTA is MU-MIMO-capable and/or capable of Direct Link Service (DLS) transmissions through capability exchanges between the two devices. In other words, messages transmitted between the AP and the DLS-TxSTA during capability exchanges may indicate one or more of these capabilities in any of various suitable manners. The AP may monitor the DLS setup between the DLS-TxSTA and the other STAs. The AP may send group ID assignments for the STAs with a DLS connection to the DLS-TxSTA as soon as the AP determines that a certain number of STAs are configured to operate in DLS mode with the DLS-TxSTA.

AP Partitions Group ID Space

In this method, the DLS-TxSTA may request for a group ID to be assigned for DLS transmissions. The AP may select and return a group ID to the DLS-TxSTA that is currently not active (i.e., no STAs have yet been allocated to the group ID). By distinguishing between inactive and active group IDs and selecting an inactive group ID for the DLS-TxSTA, the AP effectively partitions the group ID space. Then, the DLS-TxSTA may determine the spatial stream index corresponding to the group ID received from the AP and may send the group ID management message to each of the STAs corresponding to the group ID that the DLS-TxSTA requested. The DLS-TxSTA may assign the spatial stream indices in sequential order or randomly, for example, from a set of spatial stream indices (e.g., 4 spatial stream indices) that can correspond to a single group ID.

Recovering/Reassigning a Group ID Allocated for DLS

A group ID that was assigned for DLS transmission may be recovered or reassigned due to, for example: (a) a time out associated with the group ID; (b) the DLS-TxSTA leaving the network; or (c) DLS connection tear downs from the DLS-TxSTA being seen by the AP. For certain aspects where the AP assigns the group ID and spatial stream indices, the AP may send a group ID management message to each of the STAs corresponding to the DLS group ID informing the STA that the group ID is no longer valid for the STA. For other aspects where the AP partitions the group ID space, the AP may not have information about the STAs and the exact spatial stream indices corresponding to the group ID. However, the AP has information about all the STAs that have a DLS link with the DLS-TxSTA. The AP may then send a management message with a group ID delete setting to all the STAs that had a DLS link with the DLS-TxSTA.

Figure 5:
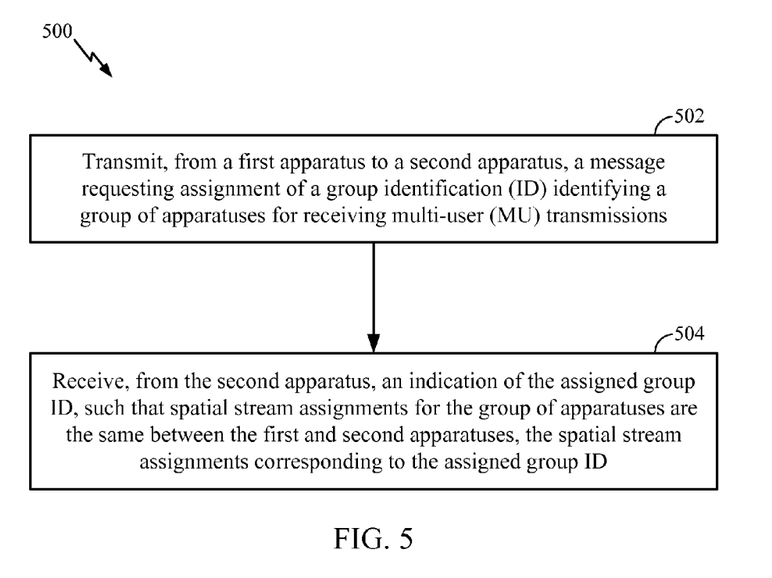
FIG. 5 illustrates example operations that may be performed from, for example, the perspective of a Direct Link Service (DLS) transmitter (DLS-TxSTA) to ensure that spatial stream assignments (corresponding to a group identifier identifying a group of STAs capable of receiving multi-user transmissions) match between an AP and the DLS-TxSTA, in accordance with certain aspects of the present disclosure.

FIG. 5 illustrates example operations 500 that may be performed from, for example, the perspective of a Direct Link Service (DLS) transmitter (DLS-TxSTA) in an effort to ensure that spatial stream assignments (corresponding to a group identifier identifying a group of STAs capable of receiving multi-user (MU) transmissions) match between an AP and the DLS-TxSTA. The operations 500 may begin, at 502, by transmitting, from a first apparatus (e.g., a DLS-TxSTA) to a second apparatus (e.g., an AP 110), a message requesting assignment of a group ID identifying a group of apparatuses (e.g., a group of STAs) for receiving MU transmissions. At 504, the first apparatus may receive, from the second apparatus, an indication of the assigned group ID, such that spatial stream assignments (corresponding to the assigned group ID) for the group of apparatuses are the same between the first and second apparatuses. For certain aspects, the receiving at 504 may also include receiving indications of the spatial stream assignments for the group of apparatuses. According to certain aspects, apparatuses in the group of apparatuses may not yet be allocated to the group ID when the indication of the assigned group ID is received from the second apparatus at 504. For certain aspects, the operations 500 may further include transmitting, from the first apparatus to at least one of the group of apparatuses, a MU transmission based on the assigned group ID and the spatial stream assignments.

For certain aspects, the first apparatus may transmit, to at least one of the group of apparatuses, another message indicating the group ID and/or the spatial stream assignments for the at least one of the group of apparatuses. For certain aspects, the first apparatus may determine the spatial stream assignments corresponding to the assigned group ID. Then, the first apparatus may transmit, to at least one of the group of apparatuses, another message indicating the group ID and the spatial stream assignments for the at least one of the group of apparatuses.

According to certain aspects, the MU transmissions may include DLS transmissions between the first apparatus and the group of apparatuses. For certain aspects, the MU transmissions may include MU-MIMO transmissions.

Figure 6:
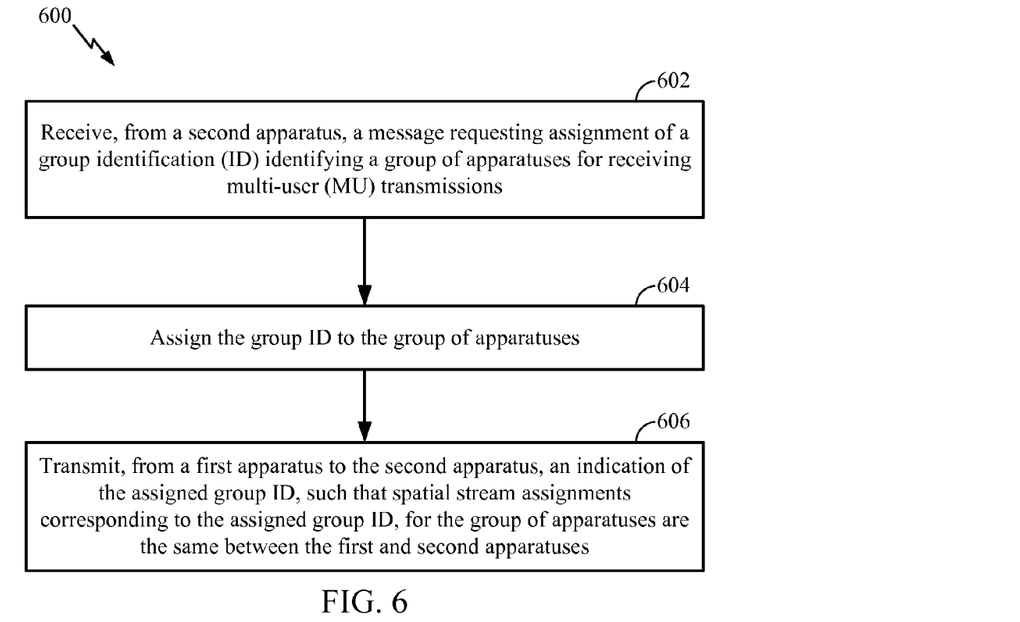
FIG. 6 illustrates example operations that may be performed from, for example, the perspective of an AP to ensure that spatial stream assignments (corresponding to a group identifier) match between an AP and the DLS-TxSTA, in accordance with certain aspects of the present disclosure.
Figure 6A:
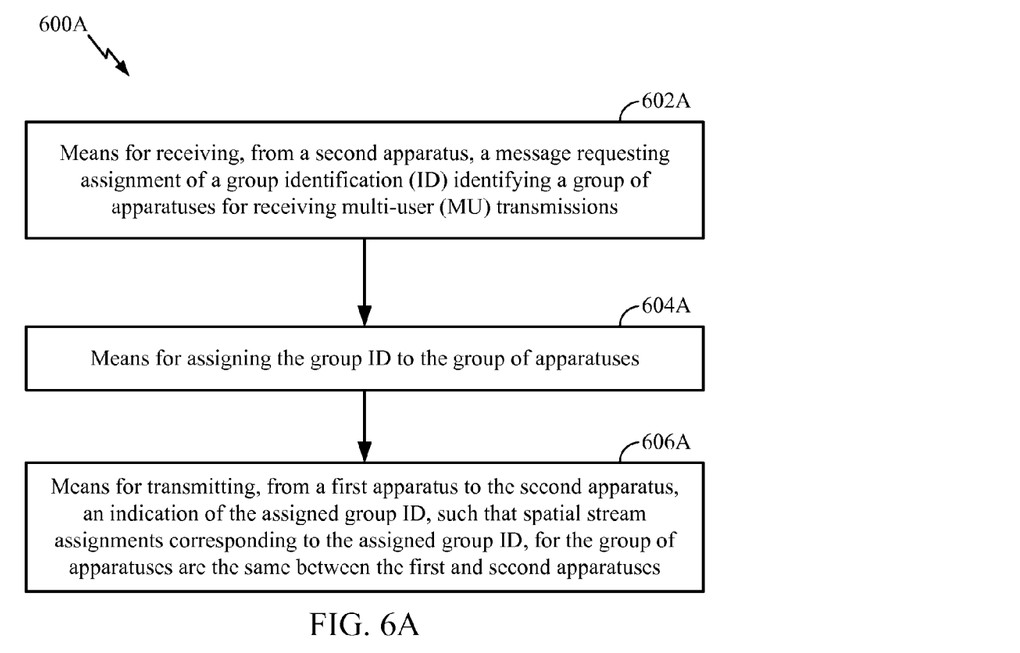
FIG. 6A illustrates example means capable of performing the operations shown in FIG. 6.

FIG. 6 illustrates example operations 600 that may be performed from, for example, the perspective of an AP to ensure that spatial stream assignments (corresponding to a group identifier) match between the AP and a DLS-TxSTA. At 602, a first apparatus (e.g., an AP 110) may receive, from a second apparatus (e.g., a DLS-TxSTA), a message requesting assignment of a group ID identifying a group of apparatuses for receiving MU transmissions. For certain aspects, the first apparatus may assign the group ID to the group of apparatuses at 604. At 606, the first apparatus may transmit, to the second apparatus in response to the request message, an indication of the assigned group ID, such that spatial stream assignments (corresponding to the assigned group ID) for the group of apparatuses are the same between the first and second apparatuses. According to certain aspects, apparatuses in the group of apparatuses may not yet be allocated to the group ID when the indication of the assigned group ID is transmitted to the second apparatus at 606.

According to certain aspects, the message received at 602 may also be used for requesting assignment of the spatial stream assignments for the group of apparatuses, and the first apparatus may also assign the spatial stream assignments at 604, for example. The first apparatus may then transmit indications of the spatial stream assignments for the group of apparatuses. For certain aspects, the first apparatus may transmit, to at least one of the group of apparatuses, another message indicating the group ID and the spatial stream assignments for the at least one of the group of apparatuses. The first apparatus may then receive an acknowledgment (ACK) from the at least one of the group of apparatuses that received the other message.

For certain aspects, the MU transmissions may comprise DLS transmissions between the second apparatus and the group of apparatuses. In this case, the first apparatus may determine that the second apparatus is configured for the DLS transmissions via capability exchanges between the first and second apparatuses. The first apparatus may then determine that a number of apparatuses have a DLS connection with the second apparatus and may transmit the spatial stream assignments to the number of apparatuses. For certain aspects, the first apparatus may receive, from the second apparatus, another message indicating that the group ID has been assigned to the group of apparatuses.

According to certain aspects, the MU transmissions may include DLS transmissions between the second apparatus and the group of apparatuses. For certain aspects, the MU transmissions may include MU-MIMO transmissions.

Figure 7:
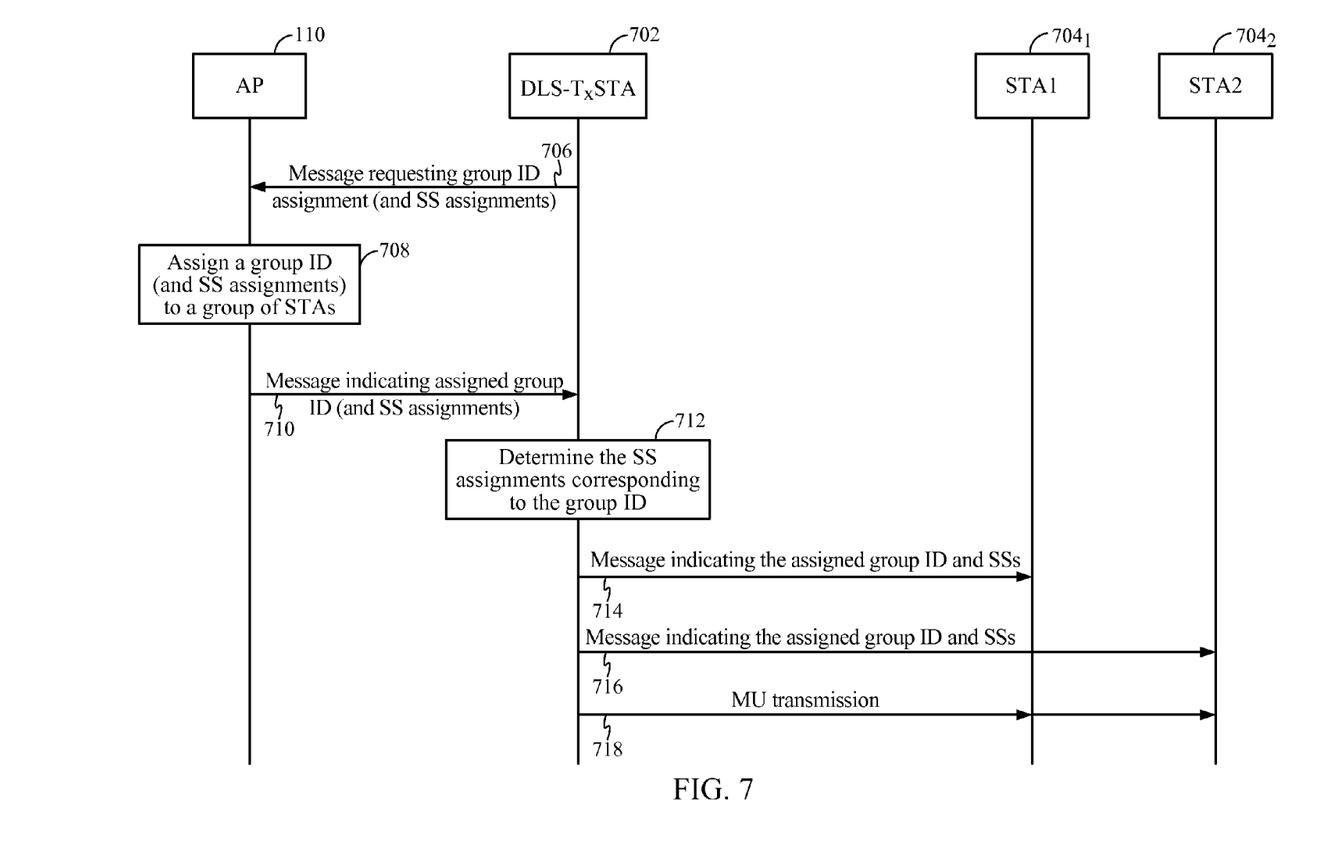
FIG. 7 is a call/data flow illustrating an exchange between a DLS-TxSTA, an AP, and a group of STAs, in accordance with certain aspects of the present disclosure.

FIG. 7 is a call/data flow illustrating communication between a DLS-TxSTA 702, an AP 110, and a group of STAs (STA1 704$_1$ and STA2 704$_2$) capable of receiving MU transmissions, such that spatial stream assignments (corresponding to a group ID identifying the group of STAs) match between the AP 110 and the DLS-TxSTA 702, in accordance with certain aspects of the present disclosure. The call/data flow corresponds to certain aspects described above with respect to the operations 500, 600 of FIGS. 5 and 6. The DLS-TxSTA 702 may be a user terminal, such as user terminal 120*e* in FIG. 1. STA1 704$_1$ and STA2 704$_2$ may also be user terminals, such as user terminals 120*g* and 120*i* in FIG. 1, which are capable of receiving peer-to-peer communications from the DLS-TxSTA 702.

At 706, the DLS-TxSTA 702 may transmit a message requesting a group ID assignment identifying a group of STAs (e.g., STA1 and STA2). For certain aspects, the message transmitted at 706 may also request spatial stream (SS) assignments. The AP 110 may assign a group ID to the group of STAs at 708. For certain aspects, the AP 110 may also determine the spatial stream assignments at 708. At 710, the AP 110 may transmit a message indicating the assigned group ID (and the spatial stream assignments).

At 712, the DLS-TxSTA 702 may determine the spatial stream assignments corresponding to the group ID, based on the message received at 710. Then, the DLS-TxSTA 702 may notify the individual STAs in the group of STAs of the assigned group ID and the spatial stream assignments. To accomplish this, the DLS-TxSTA 702 may transmit separate messages to each of the STAs in the group at 714 and 716, wherein each message indicates the assigned group ID and spatial stream assignments to one of the STAs. For certain aspects, the messages transmitted at 714 and 716 may be transmitted in any order or simultaneously. After STA1 and STA2 have been notified of the group ID and spatial stream assignments, the DLS-TxSTA 702 may send a MU transmission to the group of STAs at 718.

Figure 5A:
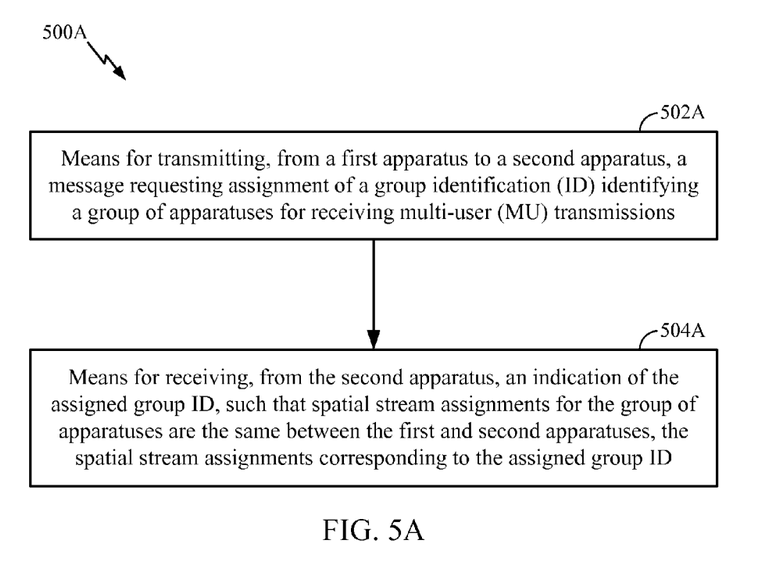
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to means 500A illustrated in FIG. 5A.

For example, the means for transmitting may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. The means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. The means for processing, means for assigning, or means for determining may comprise a processing system, which may include one or more processors, such as the RX data processor 270 and/or the controller 280 of the user terminal 120 or the RX data processor 242 and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface (in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first apparatus for wireless communications, comprising:
   a transmitter configured to transmit, to a second apparatus, a message requesting assignment of a group identifier (ID) identifying a group of apparatuses for receiving multi-user (MU) transmissions and requesting assignment of spatial stream assignments; and
   a receiver configured to receive, from the second apparatus, an indication of the assigned group ID, such that the spatial stream assignments for the group of apparatuses are the same between the first and second apparatuses, the spatial stream assignments corresponding to the assigned group ID.

2. The first apparatus of claim 1, wherein the transmitter is configured to transmit, to at least one of the group of apparatuses, a MU transmission based on the assigned group ID and the spatial stream assignments.

3. The first apparatus of claim 1, wherein the receiver is further configured to receive indications of the spatial stream assignments for the group of apparatuses.

4. The first apparatus of claim 1, wherein the transmitter is further configured to transmit, to at least one of the group of apparatuses, another message indicating the group ID and the spatial stream assignments for the at least one of the group of apparatuses.

5. The first apparatus of claim 1, further comprising a processing system configured to determine the spatial stream assignments corresponding to the assigned group ID, wherein the transmitter is further configured to transmit, to at least one of the group of apparatuses, another message indicating the group ID and the spatial stream assignments for the at least one of the group of apparatuses.

6. The first apparatus of claim 1, wherein the MU transmissions comprise at least one of:
   Direct Link Service (DLS) transmissions between the first apparatus and the group of apparatuses; or
   multi-user multiple-input multiple-output (MU-MIMO) transmissions.

7. A method for wireless communications, comprising:
   transmitting, from a first apparatus to a second apparatus, a message requesting assignment of a group identifier (ID) identifying a group of apparatuses for receiving multi-user (MU) transmissions and requesting assignment of spatial stream assignments for the group of apparatuses; and
   receiving, from the second apparatus, an indication of the assigned group ID, such that the spatial stream assignments for the group of apparatuses are the same between the first and second apparatuses, the spatial stream assignments corresponding to the assigned group ID.

8. The method of claim 7, further comprising transmitting, from the first apparatus to at least one of the group of apparatuses, a MU transmission based on the assigned group ID and the spatial stream assignments.

9. The method of claim 7, further comprising receiving indications of the spatial stream assignments for the group of apparatuses.

10. The method of claim 7, further comprising transmitting, to at least one of the group of apparatuses, another message indicating the group ID and the spatial stream assignments for the at least one of the group of apparatuses.

11. The method of claim 7, further comprising:
    determining the spatial stream assignments corresponding to the assigned group ID; and
    transmitting, to at least one of the group of apparatuses, another message indicating the group ID and the spatial stream assignments for the at least one of the group of apparatuses.

12. The method of claim 7, wherein the MU transmissions comprise at least one of:
    Direct Link Service (DLS) transmissions between the first apparatus and the group of apparatuses; or
    multi-user multiple-input multiple-output (MU-MIMO) transmissions.

13. A first apparatus for wireless communications, comprising:
    means for transmitting, to a second apparatus, a message requesting assignment of a group identifier (ID) identifying a group of apparatuses for receiving multi-user (MU) transmissions and requesting assignment of spatial stream assignments for the group of apparatuses; and
    means for receiving, from the second apparatus, an indication of the assigned group ID, such that the spatial stream assignments for the group of apparatuses are the same between the first and second apparatuses, the spatial stream assignments corresponding to the assigned group ID.

14. The first apparatus of claim 13, wherein the means for transmitting is configured to transmit, to at least one of the group of apparatuses, a MU transmission based on the assigned group ID and the spatial stream assignments.

15. The first apparatus of claim 13, wherein the means for receiving is further configured to receive indications of the spatial stream assignments for the group of apparatuses.

16. The first apparatus of claim 13, wherein the means for transmitting is further configured to transmit, to at least one of the group of apparatuses, another message indicating the group ID and the spatial stream assignments for the at least one of the group of apparatuses.

17. The first apparatus of claim 13, further comprising means for determining the spatial stream assignments corresponding to the assigned group ID, wherein the means for transmitting is further configured to transmit, to at least one of the group of apparatuses, another message indicating the group ID and the spatial stream assignments for the at least one of the group of apparatuses.

18. The first apparatus of claim 13, wherein the MU transmissions comprise at least one of:
    Direct Link Service (DLS) transmissions between the first apparatus and the group of apparatuses; or
    multi-user multiple-input multiple-output (MU-MIMO) transmissions.

19. A computer-program product for wireless communications, comprising a non-transitory computer-readable medium comprising instructions executable to:
    transmit, from a first apparatus to a second apparatus, a message requesting assignment of a group identifier (ID) identifying a group of apparatuses for receiving multi-user (MU) transmissions and requesting assignment of spatial stream assignments; and
    receive, from the second apparatus, an indication of the assigned group ID, such that the spatial stream assignments for the group of apparatuses are the same between the first and second apparatuses, the spatial stream assignments corresponding to the assigned group ID.

20. A wireless node, comprising:
at least one antenna;
a transmitter configured to transmit, to an apparatus, a message requesting assignment of a group identifier (ID) identifying a group of apparatuses for receiving multi-user (MU) transmissions and requesting assignment of spatial stream assignments; and
a receiver configured to receive, from the apparatus, an indication of the assigned group ID, such that the spatial stream assignments for the group of apparatuses are the same between the wireless node and the apparatus, the spatial stream assignments corresponding to the assigned group ID.

21. A first apparatus for wireless communications, comprising:
a receiver configured to receive, from a second apparatus, a message requesting assignment of a group identifier (ID) identifying a group of apparatuses for receiving multi-user (MU) transmissions and requesting assignment of spatial stream assignments; and
a transmitter configured to transmit, to the second apparatus, an indication of the assigned group ID, such that the spatial stream assignments, corresponding to the assigned group ID, for the group of apparatuses are the same between the first and second apparatuses.

22. The first apparatus of claim 21, further comprising a processing system configured to assign the group ID to the group of apparatuses.

23. The first apparatus of claim 22, wherein the processing system is configured to assign the group ID and the spatial stream assignments, and wherein the transmitter is further configured to transmit indications of the spatial stream assignments for the group of apparatuses.

24. The first apparatus of claim 23, wherein the transmitter is configured to transmit, to at least one of the group of apparatuses, another message indicating the group ID and the spatial stream assignments for the at least one of the group of apparatuses.

25. The first apparatus of claim 24, wherein the receiver is further configured to receive an acknowledgment (ACK) from the at least one of the group of apparatuses that received the other message.

26. The first apparatus of claim 21, further comprising a processing system, wherein the MU transmissions comprise Direct Link Service (DLS) transmissions between the second apparatus and the group of apparatuses, wherein the processing system is configured to determine that the second apparatus is configured for the DLS transmissions via capability exchanges between the first and second apparatuses and to determine that a number of apparatuses have a DLS connection with the second apparatus, and wherein the transmitter is configured to transmit the spatial stream assignments to the number of apparatuses.

27. The first apparatus of claim 21, wherein the MU transmissions comprise at least one of:
Direct Link Service (DLS) transmissions between the second apparatus and the group of apparatuses; or
multi-user multiple-input multiple-output (MU-MIMO) transmissions.

28. A method for wireless communications, comprising:
receiving, at a first apparatus from a second apparatus, a message requesting assignment of a group identifier (ID) identifying a group of apparatuses for receiving multi-user (MU) transmissions and requesting assignment of spatial stream assignments for the group of apparatuses; and
transmitting, to the second apparatus, an indication of the assigned group ID, such that the spatial stream assignments, corresponding to the assigned group ID, for the group of apparatuses are the same between the first and second apparatuses.

29. The method of claim 28, further comprising assigning the group ID to the group of apparatuses.

30. The method of claim 29, further comprising:
assigning the spatial stream assignments; and
transmitting indications of the spatial stream assignments for the group of apparatuses.

31. The method of claim 30, further comprising transmitting, to at least one of the group of apparatuses, another message indicating the group ID and the spatial stream assignments for the at least one of the group of apparatuses.

32. The method of claim 31, further comprising receiving an acknowledgment (ACK) from the at least one of the group of apparatuses that received the other message.

33. The method of claim 28, further comprising:
determining, wherein the MU transmissions comprise Direct Link Service (DLS) transmissions between the second apparatus and the group of apparatuses, that the second apparatus is configured for the DLS transmissions via capability exchanges between the first and second apparatuses;
determining that a number of apparatuses have a DLS connection with the second apparatus; and
transmitting the spatial stream assignments to the number of apparatuses.

34. The method of claim 28, wherein the MU transmissions comprise at least one of:
Direct Link Service (DLS) transmissions between the second apparatus and the group of apparatuses; or
multi-user multiple-input multiple-output (MU-MIMO) transmissions.

35. A first apparatus for wireless communications, comprising:
means for receiving, from a second apparatus, a message requesting assignment of a group identifier (ID) identifying a group of apparatuses for receiving multi-user (MU) transmissions and requesting assignment of spatial stream assignments for the group of apparatuses; and
means for transmitting, to the second apparatus, an indication of the assigned group ID, such that the spatial stream assignments, corresponding to the assigned group ID, for the group of apparatuses are the same between the first and second apparatuses.

36. The first apparatus of claim 35, further comprising means for assigning the group ID to the group of apparatuses.

37. The first apparatus of claim 36 wherein the means for assigning is further configured to assign the spatial stream assignments, and wherein the means for transmitting is further configured to transmit indications of the spatial stream assignments for the group of apparatuses.

38. The first apparatus of claim 37, wherein the means for transmitting is further configured to transmit, to at least one of the group of apparatuses, another message indicating the group ID and the spatial stream assignments for the at least one of the group of apparatuses.

39. The first apparatus of claim 38, wherein the means for receiving is further configured to receive an acknowledgment (ACK) from the at least one of the group of apparatuses that received the other message.

40. The first apparatus of claim 35, further comprising:
means for determining, wherein the MU transmissions comprise Direct Link Service (DLS) transmissions between the second apparatus and the group of apparatuses, that the second apparatus is configured for the DLS transmissions via capability exchanges between the first and second apparatuses; and means for determining that a number of apparatuses have a DLS connection with the second apparatus, wherein the means for transmitting is further configured to transmit the spatial stream assignments to the number of apparatuses.

41. The first apparatus of claim 35, wherein the MU transmissions comprise at least one of:

Direct Link Service (DLS) transmissions between the second apparatus and the group of apparatuses; or multi-user multiple-input multiple-output (MU-MIMO) transmissions.

42. A computer-program product for wireless communications, comprising a non-transitory computer-readable medium comprising instructions executable to:

receive, at a first apparatus from a second apparatus, a message requesting assignment of a group identifier (ID) identifying a group of apparatuses for receiving multi-user (MU) transmissions and requesting assignment of spatial stream assignments;

transmit, to the second apparatus, an indication of the assigned group ID, such that the spatial stream assignments, corresponding to the assigned group ID, for the group of apparatuses are the same between the first and second apparatuses.

43. An access point, comprising:

at least one antenna;

a receiver configured to receive, from an apparatus via the at least one antenna, a message requesting assignment of a group identifier (ID) identifying a group of apparatuses for receiving multi-user (MU) transmissions and requesting assignment of spatial stream assignments; and a transmitter configured to transmit, to the apparatus, an indication of the assigned group ID, such that the spatial stream assignments, corresponding to the assigned group ID, for the group of apparatuses are the same between the access point and the apparatus.

* * * * *